US010789727B2

(12) United States Patent
Fujimura et al.

(10) Patent No.: US 10,789,727 B2
(45) Date of Patent: Sep. 29, 2020

(54) INFORMATION PROCESSING APPARATUS AND NON-TRANSITORY RECORDING MEDIUM STORING THEREON A COMPUTER PROGRAM (71) Applicant: Panasonic Intellectual Property Corporation of America, Torrance, CA (US)

(72) Inventors: Ryota Fujimura, Kanagawa (JP); Yasunori Ishii, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 269 days.

(21) Appl. No.: 15/956,399

(22) Filed: Apr. 18, 2018

(65) Prior Publication Data
US 2018/0336695 A1 Nov. 22, 2018

(30) Foreign Application Priority Data

May 18, 2017 (JP) .................. 2017-098663
Jan. 15, 2018 (JP) .................. 2018-003976

(51) Int. Cl.
*G06K 9/00* (2006.01)
*G06T 7/70* (2017.01)
(Continued)

(52) U.S. Cl.
CPC ............ *G06T 7/70* (2017.01); *G06K 9/00791* (2013.01); *G06K 9/00805* (2013.01); *G06T 7/11* (2017.01);
(Continued)

(58) Field of Classification Search
None
See application file for complete search history.

(56) References Cited

U.S. PATENT DOCUMENTS

| 2011/0255740 | A1* | 10/2011 | Wu | G06K 9/00785 |
| | | | | 382/103 |
| 2013/0002860 | A1* | 1/2013 | Yamaguchi | G01B 11/2513 |
| | | | | 348/135 |
| 2015/0071490 | A1* | 3/2015 | Fukata | G06K 9/00791 |
| | | | | 382/103 |

FOREIGN PATENT DOCUMENTS

| JP | 2013-092820 | 5/2013 |
| WO | 2011067790 A2 | 6/2011 |

OTHER PUBLICATIONS

The Extended European Search Report dated Nov. 6, 2018 and issued in the related European Patent Application No. 18168907.6.
(Continued)

*Primary Examiner* — Wei Wen Yang
(74) *Attorney, Agent, or Firm* — Greenblum & Bernstein, P.L.C.

(57) ABSTRACT

To provide an information processing apparatus and a program, which are capable of accurately estimating the distance from a monocular camera to an object. The information processing apparatus acquires an image captured by one monocular camera, determines an object area in the image, divides the object area based on variation in a predetermined direction at an end portion in the predetermined direction of the determined object area, and estimates a distance from the monocular camera to an object corresponding to at least one partial object area resulting from the division of the object area.

10 Claims, 3 Drawing Sheets (51) Int. Cl.
*G06T 7/11* (2017.01)
*G06T 7/136* (2017.01)
(52) U.S. Cl.
CPC .......... *G06T 7/136* (2017.01); *G06K 2209/23* (2013.01); *G06T 2207/20021* (2013.01)

(56) References Cited

OTHER PUBLICATIONS

Rezaei Mahdi et al: "Robust Vehicle Detection and Distance Estimation Under Challenging Lighting Conditions", IEEE Transactions on Intelligent Transportation Systems, IEEE, Piscataway, NJ, USA, vol. 16, No. 5, Oct. 1, 2015 (Oct. 1, 2015), pp. 2723-2743, XP011670189.

Rad R et al: "Real time classification and tracking of multiple vehicles in highways", Pattern Recognition Letters, Elsevier, Amsterdam, NL, vol. 26, No. 10, Jul. 15, 2005 (Jul. 15, 2005), pp. 1597-1607, XP025292389.

* cited by examiner

INFORMATION PROCESSING APPARATUS AND NON-TRANSITORY RECORDING MEDIUM STORING THEREON A COMPUTER PROGRAM

BACKGROUND

1. Technical Field

The present disclosure relates to an information processing apparatus and a non-transitory recording medium storing thereon a computer program.

2. Description of the Related Art

Distance estimation apparatuses are known in recent years, which recognize obstacles from images captured by cameras and calculate the distances from host vehicles to the obstacles based on predetermined distance tables. However, it may be difficult to calculate the accurate distances if roads are inclined only by calculating the distances from the host vehicles to the obstacles based on the distance tables.

Accordingly, Japanese Unexamined Patent Application Publication No. 2013-92820 discloses a distance estimation apparatus capable of calculating the distance from a host vehicle to an obstacle even if a road is inclined. The distance estimation apparatus includes a video camera for image capturing, which is mounted in the host vehicle, and a distance calculating unit that calculates the distance between the host vehicle and an obstacle.

The distance estimation apparatus extracts a normal vector of an obstacle from an image captured by the video camera and determines whether the host vehicle is running on a slope based on the extracted normal vector. If the distance estimation apparatus determines that the host vehicle is running on a slope, the distance estimation apparatus calculates the angle of inclination of the slope with respect to a flat road. Then, the distance calculating unit corrects the distance from a boundary between the flat road and the slope to the obstacle based on the calculated angle of inclination to calculate the distance between the host vehicle and the obstacle.

SUMMARY

However, with the distance estimation apparatus disclosed in Japanese Unexamined Patent Application Publication No. 2013-92820, it may be difficult to accurately estimate the distance from a host vehicle to an obstacle. For example, although the distance estimation apparatus is capable of correcting the distance from the host vehicle to the obstacle based on the angle of inclination, it may be difficult for the distance estimation apparatus to accurately calculate the position where the obstacle is in contact with a road surface. Accordingly, a difference may occur in the distance from the host vehicle to the obstacle.

One non-limiting and exemplary embodiment provides an information processing apparatus and a non-transitory recording medium storing thereon, which are capable of accurately estimating the distance from a monocular camera to an object.

According to the information processing apparatus and the non-transitory recording medium storing thereon, it is possible to accurately estimate the distance from a monocular camera to an object.

In one general aspect, the techniques disclosed here feature an apparatus including a processor and a memory storing thereon a computer program, which when executed by the processor, causes the processor to perform operations. The operations include acquiring an image captured by one monocular camera, determining an object area in the image, dividing the object area based on variation in a certain direction at an end portion in the certain direction of the determined object area, and estimating a distance from the monocular camera to an object corresponding to at least one partial object area resulting from the division of the object area.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Although distance measurement technologies using monocular cameras (hereinafter also simply referred to as cameras) have hitherto been proposed, as described above, the distance measurement technologies in the related art have various problems. Specifically, although it is necessary to detect a contact area of an object with a road surface from an image captured by a camera in measurement of the distance based on the contact area of the object, it may be difficult to accurately detect the contact area with the technologies in the related art. In order to resolve this problem, the inventors of the present disclosure considered use of area division technologies. The area division technologies are used to divide images into areas corresponding to objects in the images. However, even with such an area division technology, it may be difficult to accurately calculate the distance from a camera to each object if multiple objects are overlapped with each other or are adjacent to each other on an image.

Accordingly, an information processing apparatus according to an embodiment of the present disclosure includes an image acquiring unit that acquires an image captured by one monocular camera, an area determining unit that determines an object area in the image, an area dividing unit that divides the object area based on variation in a certain direction at an end portion in the certain direction of the determined object area, and a distance estimating unit that estimates a distance from the monocular camera to an object corresponding to at least one partial object area resulting from the division of the object area.

Since the object area is divided based on the variation in the certain direction at the end portion of the object area in the image, as described above, the individual objects are capable of being discriminated even when the object area includes multiple objects. Accordingly, the distances from the monocular camera to the individual objects are capable of being estimated.

Consequently, with the information processing apparatus, it is possible to accurately estimate the distance from the monocular camera to a desired object even when the image includes multiple objects.

A program according to an embodiment of the present disclosure includes acquiring an image captured by one monocular camera, determining an object area in the image, dividing the object area based on variation in a certain direction at an end portion in the certain direction of the determined object area, and estimating a distance from the monocular camera to an object corresponding to at least one partial object area resulting from the division of the object area.

Executing the above program in the above manner enables the information processing apparatus to achieve the above effects and advantages.

Comprehensive or specific aspects described above may be realized by a system, a method, an integrated circuit, a computer program, or a computer-readable recording medium, such as a compact disc read only memory (CD-ROM), or may be realized by arbitrary combination of the system, the method, the integrated circuit, the computer program, and the recording medium.

Embodiments will herein be specifically described with reference to the drawings. The embodiments described below indicate specific examples of the present disclosure. Numerical values, shapes, materials, components, the positions where the components are disposed, the connection mode of the components, steps, the order of steps, and so on, which are indicated in the embodiments described below, are only examples and are not intended to limit the present disclosure. Among the components in the embodiments described below, the components that are not described in the independent claims indicating the highest concepts may be described as optional components.

The diagrams are schematic diagrams and are not necessarily strictly illustrated. The same reference numerals are used in the drawings to identify the substantially same components and duplicated description of such components may be omitted or simplified.

An information processing apparatus and a program according to embodiments of the present disclosure will be described.

Embodiments

[Configuration]
Exemplary configurations of an information processing apparatus 100 according to an embodiment and a vehicle 3 in which the information processing apparatus 100 is mounted will now be described with reference to FIG. 1, FIG. 2, and FIG. 3A to FIG. 3G.

Figure 1:
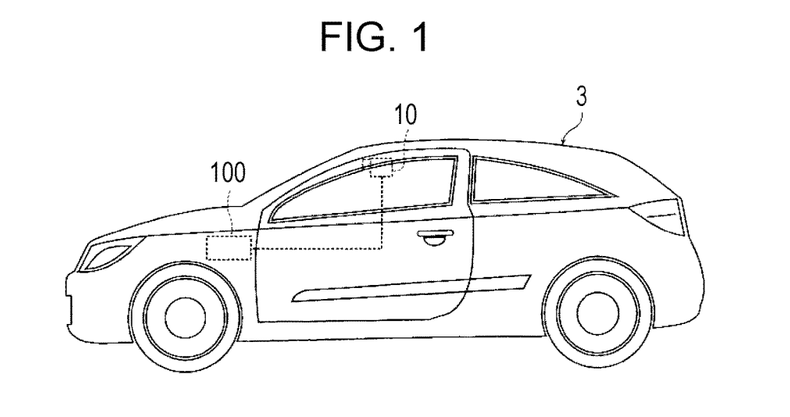
FIG. 1 is a schematic diagram illustrating a vehicle in which an information processing apparatus according to an embodiment is mounted.
Figure 2:
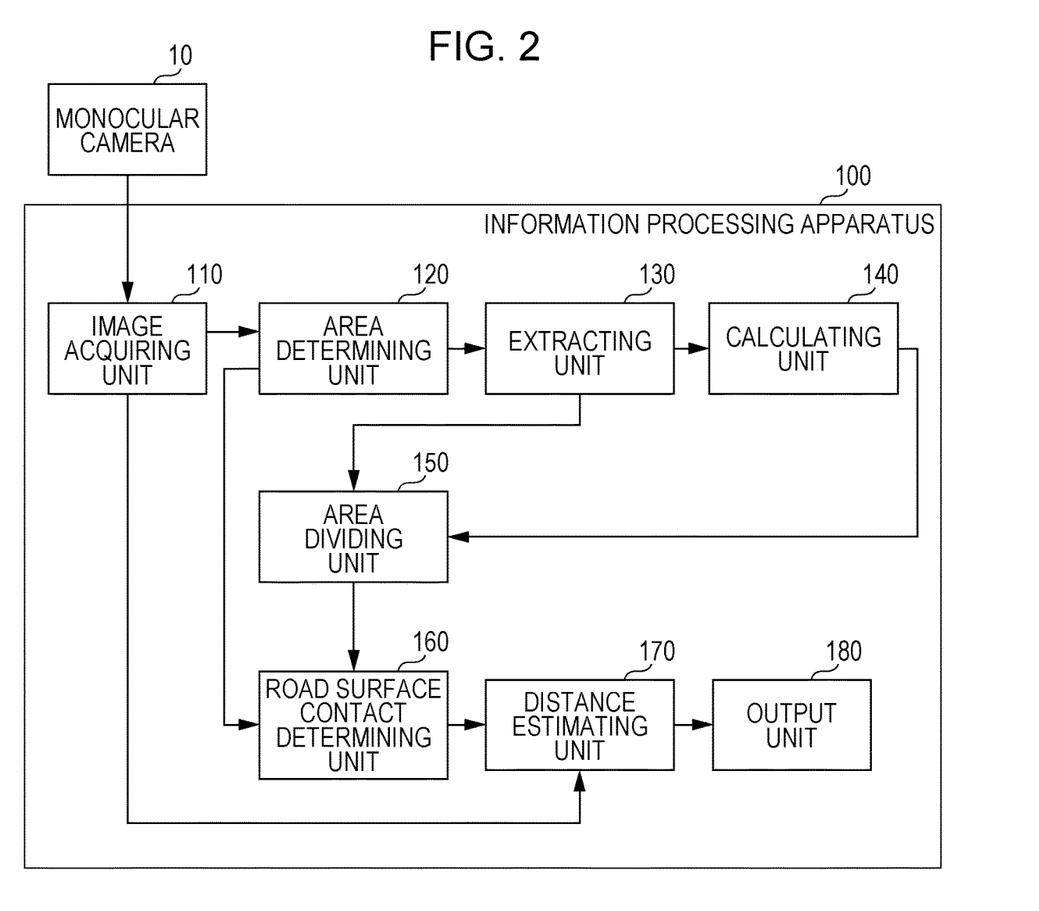
FIG. 2 is a block diagram illustrating an exemplary functional configuration of the information processing apparatus according to the embodiment.

FIG. 1 is a schematic diagram illustrating the vehicle 3 in which the information processing apparatus 100 according to the embodiment is mounted. FIG. 2 is a block diagram illustrating an exemplary functional configuration of the information processing apparatus 100 according to the embodiment. FIGS. 3A to 3G are diagrams for describing a process performed by the information processing apparatus 100 according to the embodiment.

As illustrated in FIG. 1 and FIG. 2, the information processing apparatus 100 is capable of estimating the distance from a monocular camera 10 to an object based on an image captured by the monocular camera 10. The monocular camera 10 and the information processing apparatus 100 are mounted in the vehicle 3. The image may be a still image or a moving image.

The monocular camera 10 is disposed in the vehicle 3 so as to be capable of capturing an image around the vehicle 3. Although the monocular camera 10 is disposed in the vehicle 3 so as to capture an image in front of the vehicle 3 in the present embodiment, the monocular camera 10 may be disposed on, for example, a radiator grille or a bonnet. The monocular camera 10 may be disposed in any manner as long as the monocular camera 10 is disposed so as to be capable of capturing an image of an object.

The monocular camera 10 is electrically connected to the information processing apparatus 100, performs certain processing to an image captured by the monocular camera 10 to generate image data, and supplies the image data to the information processing apparatus 100. The monocular camera 10 captures an image around the vehicle 3 at predetermined time intervals. Although the monocular camera 10 is disposed outside the information processing apparatus 100 in the present embodiment, the monocular camera 10 may be incorporated in the information processing apparatus 100.

The information processing apparatus 100 includes an image acquiring unit 110, an area determining unit 120, an extracting unit 130, a calculating unit 140, an area dividing unit 150, a road surface contact determining unit 160, a distance estimating unit 170, and an output unit 180.

Figure 3A:
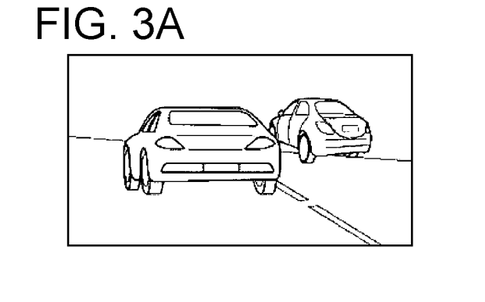
FIGS. 3A to 3G are diagrams for describing a process performed by the information processing apparatus according to the embodiment.

FIG. 3A illustrates an example of the image data captured by the monocular camera 10. As illustrated in FIG. 3A, the image acquiring unit 110 acquires the image data captured by one monocular camera 10. Specifically, the image acquiring unit 110 supplies the image data to the area determining unit 120 and the distance estimating unit 170.

Figure 3B:
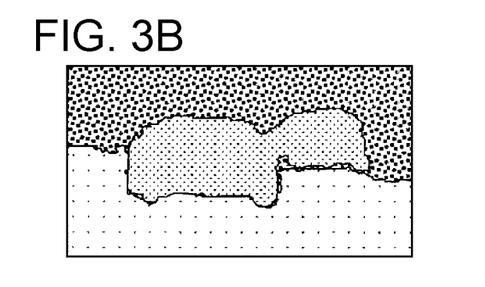

The area determining unit 120 acquires the image data from the image acquiring unit 110. FIG. 3B illustrates a result of determination of areas in an image represented by the image data. As illustrated in FIG. 3B, the area determining unit 120 determines at least an object area in the image and a road surface area in the image. Specifically, the area determining unit 120 uses a technology, called semantic segmentation, in which the kind of each object in an image is determined for each pixel in the image and the object area is detected for each object kind based on the result of the determination. For example, the area determining unit 120 uses the semantic segmentation to determine vehicles as objects, a roadway as a road surface, and the background in the image and extract the area of the vehicles, the area of the roadway, and the area of the background, as illustrated in FIG. 3B. Then, the area determining unit 120 supplies area data indicating the object area, the road surface area, and so on, which are extracted, to the extracting unit 130 and the road surface contact determining unit 160. The objects are, for example, a person, an automobile, a motorcycle, and a bicycle. The road surface is a road, such as a roadway or a sidewalk, on which the objects pass through.

Figure 3C:
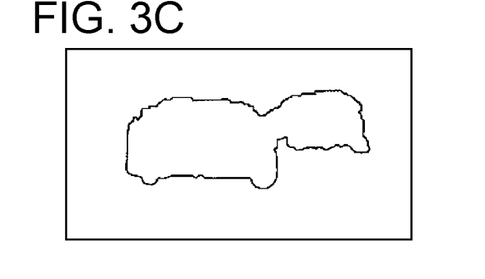

The extracting unit 130 acquires the area data from the area determining unit 120. FIG. 3C illustrates a result of extraction of an outline of the object area. As illustrated in FIG. 3C, the extracting unit 130 extracts the outline of the object area from the area data. Specifically, the extracting unit 130 extracts the outline of the object area, among the areas indicated by the area data. For example, the extracting unit 130 extracts the outline of one object area including two vehicles, as illustrated in FIG. 3C.

Figure 3D:
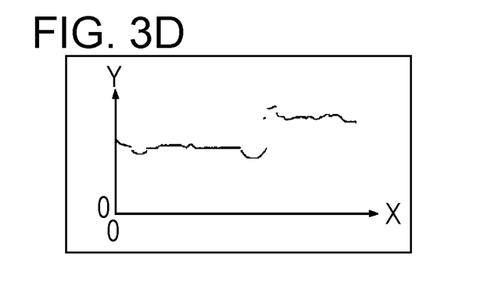

FIG. 3D illustrates a result of extraction of a bottom end of the outline of the object area. As illustrated in FIG. 3D, the extracting unit 130 extracts an end in a certain direction of the outline from the result of extraction of the outline of the object area. For example, when the horizontal direction of the image is defined as the X-axis direction and the vertical direction of the image is defined as the Y-axis direction, the extracting unit 130 extracts the bottom end in the Y-axis direction, which is the certain direction, of the outline. Then, the extracting unit 130 supplies bottom end data indicating the extracted bottom end of the outline of the object area to the calculating unit 140. In addition, the extracting unit 130 supplies outline data indicating the extracted outline of the object area to the area dividing unit 150. The area determining unit 120 may extract the outline of the object area and extracts the bottom end of the outline of the object area. A collection of end points in the Y-axis direction of the object area is an example of the bottom end of the outline of the object area.

Figure 3E:
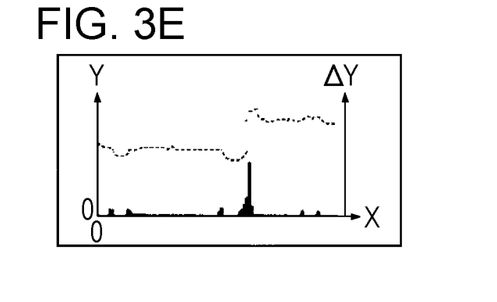

The calculating unit 140 acquires the bottom end data from the extracting unit 130. FIG. 3E illustrates how the bottom end of the outline of the object area are varied in the Y-axis direction. As illustrated in FIG. 3E, the calculating unit 140 detects the variation in the Y-axis direction of the end portion of the object area. Specifically, the calculating unit 140 calculates an amount of change ΔY in the Y-axis direction of the bottom end of the outline of the object area. The calculating unit 140 supplies amount-of-change data indicating the calculated amount of change ΔY to the area dividing unit 150 in association with the outline data.

The area dividing unit 150 acquires the outline data supplied from the extracting unit 130 and the amount-of-change data supplied from the calculating unit 140. The area dividing unit 150 determines whether the amount of change ΔY indicated by the amount-of-change data is greater than or equal to a predetermined threshold value and divides the object area based on the end portion the amount of change ΔY of which is greater than or equal to the predetermined threshold value.

Figure 3F:
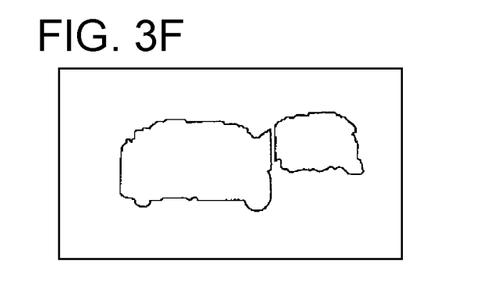

FIG. 3F illustrates the object area that is divided. As illustrated in FIG. 3F, the area dividing unit 150 cuts off the object area in the Y-axis direction based on the bottom end portion the amount of change of which, calculated by the calculating unit 140, is greater than or equal to the predetermined threshold value. For example, the area dividing unit 150 identifies two bottom end points the amount of change in the Y-axis direction of which is greater than or equal to the predetermined threshold value, among bottom end points composing the bottom end of the outline of the object area, and divides the outline of the object area by cutting off the outline of the object area along a straight line in the Y-axis direction passing through the bottom end point toward the X-axis direction, among the two bottom end points. The outline of the object area is divided into two or more portions by the area dividing unit 150. The area dividing unit 150 supplies division data indicating the result of division of the outline of the object area to the road surface contact determining unit 160. Although the example is described in which the outline of the object area is divided, the object area itself may be divided.

Although the area dividing unit 150 identifies the two bottom end points and divides the outline of the object area by cutting off the outline of the object area along the straight line in the Y-axis direction passing through one of the two bottom end points, the dividing method is not limited to this.

The threshold value of the amount of change is set in accordance with, for example, the size of the object area. For example, the area dividing unit 150 may set, as the threshold value of the amount of change, a first threshold value if the size of the object area is greater than a predetermined value and may set a second threshold value lower than the first threshold value if the size of the object area is smaller than or equal to the predetermined value.

Specifically, the case in which the size of the object area is greater than the predetermined value is exemplified by a case in which an object exists near the vehicle 3. Since the size of the object area is increased as the object is closer to the vehicle 3, the amount of change in the Y-axis direction tends to be increased in accordance with the size of the object area. Accordingly, the area dividing unit 150 may set the first threshold value higher than the second threshold value.

The case in which the size of the object area is smaller than or equal to the predetermined value is exemplified by a case in which an object is apart from the vehicle 3. Since the size of the object area is decreased as the object is more apart from the vehicle 3, the amount of change in the Y-axis direction tends to be decreased in accordance with the size of the object area. Accordingly, the area dividing unit 150 may set the second threshold value lower than the first threshold value.

Since the first threshold value and the second threshold value are examples of the predetermined threshold value, the number of the threshold values of the amount of change is not limited to two and three or more threshold values of the amount of change may be used. In addition, the threshold value of the amount of change may be a value calculated using the size of the object area as an input. The predetermined value, the first threshold value, and the second threshold value may be arbitrarily set. The predetermined value is not limited to one value and multiple predetermined values may be set.

The road surface contact determining unit 160 acquires the area data from the area determining unit 120. In addition, the road surface contact determining unit 160 acquires the division data from the area dividing unit 150. The road surface contact determining unit 160 determines whether a partial object area, resulting from the division of the object area indicated by the division data, is in contact with the road surface area. Specifically, the road surface contact determining unit 160 sets a contact determination area including the bottom end of the outline of the partial object area and determines whether the partial object area is in contact with the road surface area based on the degree of inclusion of the road surface area with respect to the contact determination area. In the present embodiment, for example, the road surface contact determining unit 160 sets an area within a certain number of pixels from the bottom end of the outline of the partial object area as the contact determination area and determines whether the road surface area makes up a certain proportion or more of the contact determination area. Then, the road surface contact determining unit 160 supplies contact data indicating the partial object area, in which the road surface area makes up the certain proportion or more of the contact determination area, to the distance estimating unit 170.

The distance estimating unit 170 estimates the distance from the monocular camera 10 to the object corresponding to each partial object area. Specifically, if the road surface contact determining unit 160 determines that the partial object area is in contact with the road surface area, the distance estimating unit 170 estimates the distance from the monocular camera 10 to the object corresponding to the partial object area. Accordingly, if the partial object area is not in contact with the road surface area, the distance estimating unit 170 does not estimate the distance from the monocular camera 10 to the object corresponding to the partial object area.

When the partial object area is in contact with the road surface area, the distance estimating unit 170 further estimates the distance from the monocular camera 10 to the object corresponding to the partial object area for the road surface of a predetermined kind. The kind of the road surface is determined by the road surface contact determining unit 160. For example, an automobile running on a roadway (that is, in contact with the roadway) may affect the course of the vehicle 3 running on the roadway. Accordingly, the distance estimating unit 170 estimates the distance if the kind of the road surface is the roadway. In contrast, it is difficult for, for example, a roadside tree planted on a sidewalk (that is, in contact with the sidewalk) to affect the course of the vehicle 3 running on the roadway. Accordingly, the distance estimating unit 170 does not estimate the distance if the kind of the road surface is the sidewalk.

When the partial object area is in contact with the road surface area, the distance estimating unit 170 further estimates the distance from the monocular camera 10 to the object corresponding to the partial object area for the object of a predetermined kind. For example, a mobile object, such as a person or an automobile, may affect the course of the vehicle 3. Accordingly, the distance estimating unit 170 estimates the distance if the kind of the object is the mobile object. In contrast, it is difficult for a fixed object, such as a building or a tree, to affect the course of the vehicle 3. Accordingly, the distance estimating unit 170 does not estimate the distance if the kind of the object is the fixed object. As described above, the kind of the road surface and the kind of the object may be determined based on whether the kind of the road surface and the kind of the object affect the behavior or the control of the vehicle 3, such as the course or the speed of the vehicle 3.

The distance estimating unit 170 may further estimate the distance when the pair of the kind of the road surface and the kind of the object is a predetermined pair. Specifically, the distance estimating unit 170 may estimate the distance from the monocular camera 10 to the object corresponding to the partial object area if the determined pair of the kind of the road surface and the kind of the object is a predetermined pair, such as a pair of the roadway and the automobile, a pair of the sidewalk and the person, or a pair of the sidewalk and the roadside tree.

The distance estimating unit 170 estimates the distance from the monocular camera 10 to the object based on the coordinate of the bottom end of each object included in the division data and characteristics of the monocular camera 10. For example, the distance estimating unit 170 estimates the distance from the monocular camera 10 to the object using the coordinate of the bottom end corresponding to the partial object area, the focal distance of the lens of the monocular camera 10, and information about setting of the monocular camera 10 in the vehicle 3. Another method of estimating the distance from the monocular camera 10 to each object corresponding to the partial object area may be used in the estimation of the distance. Correction using the actual size of the object corresponding to the partial object area and the size of the object in the image may be made in the estimation of the distance.

Figure 3G:
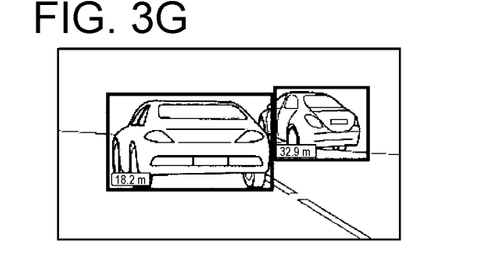

The distance estimating unit 170 supplies distance data indicating the estimated distance to the output unit 180. The distance data may be the numerical value (one-dimensional data) of the estimated distance or may be data (two-dimensional data or three-dimensional data) indicating the positional relationship in the two-dimensional space or the three-dimensional space. The distance estimating unit 170 may supply the image data based on the distance data to the output unit 180. FIG. 3G illustrates an exemplary image on which the result of recognition of the objects and the estimated distances are superimposed. As illustrated in FIG. 3G, the distance estimating unit 170 may associate the data indicating the distance from the monocular camera 10 to the object with the image data acquired from the image acquiring unit 110 and may supply the data after the association to the output unit 180. For example, the distance estimating unit 170 supplies the image data in which an object indicating the extracted partial object area and an object indicating the distance estimated for each partial object area are superimposed on the image data to the output unit 180.

The output unit 180 transmits the distance from the monocular camera 10 to the object in the image, which is estimated by the distance estimating unit 170, to an external apparatus. Specifically, the output unit 180 transmits the distance data acquired from the distance estimating unit 170 to an external apparatus. The output unit 180 may transmit the image data acquired from the distance estimating unit 170 to an external apparatus. The external apparatus is, for example, a control apparatus included in the vehicle 3 for automatic driving or a car navigation system or a smartphone, which serves as a display apparatus that displays an image. For example, the control apparatus performs control, such as acceleration, deceleration, steering, or setting of the driving route of the vehicle 3, using the acquired distance data.

[Operation]

An exemplary operation of the information processing apparatus 100 in the present embodiment will now be described with reference to FIG. 3A to FIG. 3G and FIG. 4.

Figure 4:
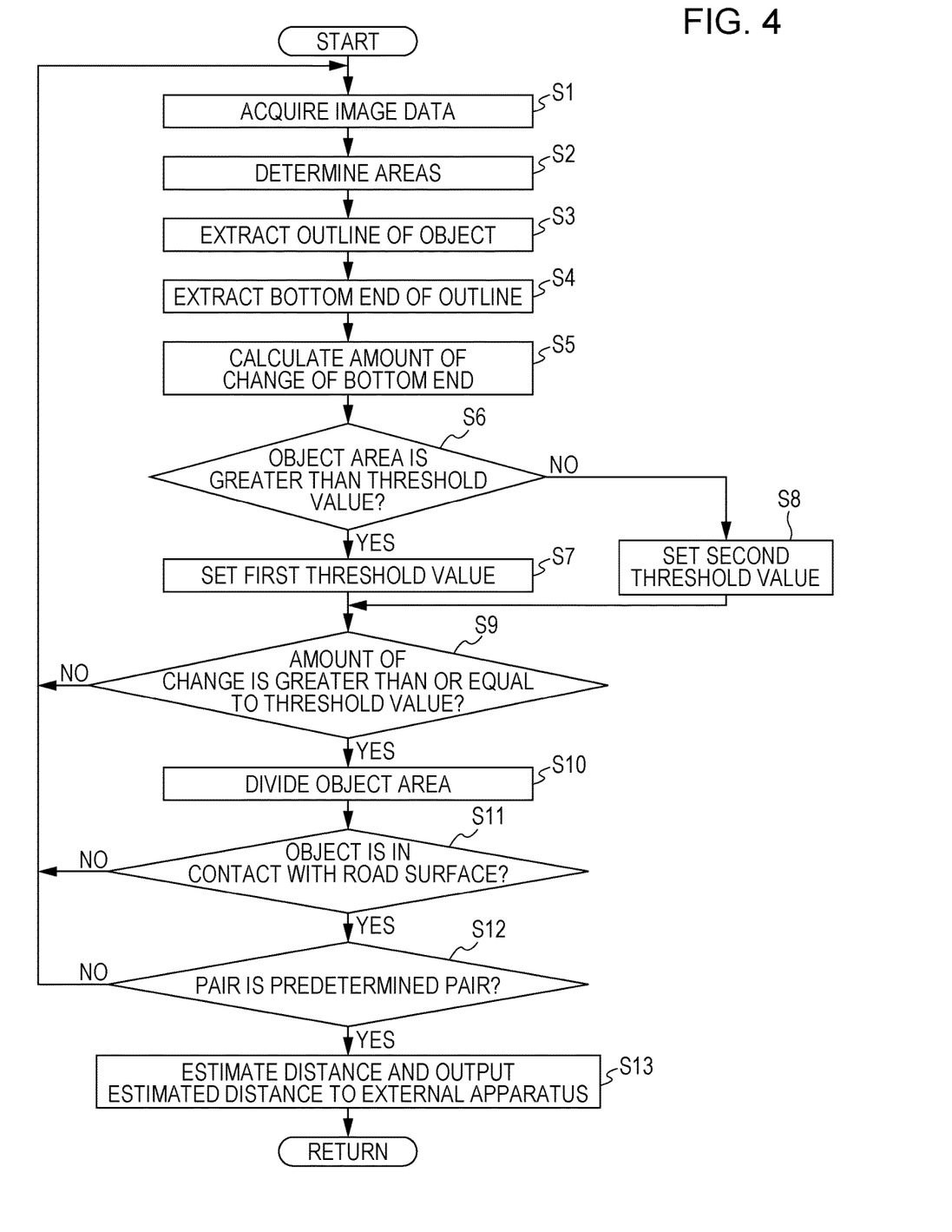
FIG. 4 is a flowchart illustrating an operational process performed by the information processing apparatus according to the present embodiment.

FIG. 4 is a flowchart illustrating an operational process performed by the information processing apparatus 100 according to the present embodiment.

A case is supposed in this flowchart in which, while a vehicle in which the information processing apparatus 100 is mounted is driving, another vehicle running on the road surface exists.

As illustrated in FIG. 3A and Step S1 in FIG. 4, the monocular camera 10 transmits the image data generated through image capturing to the image acquiring unit 110 and the image acquiring unit 110 receives the image data. The image acquiring unit 110 supplies the image data to the area determining unit 120 and the distance estimating unit 170.

As illustrated in FIG. 3B and Step S2 in FIG. 4, the area determining unit 120 determines the object area and the road surface area in the image based on the image data acquired from the image acquiring unit 110. The area determining unit 120 supplies the area data indicating the object area and the road surface area, which are determined, to the extracting unit 130 and the road surface contact determining unit 160.

As illustrated in FIG. 3C and Step S3 in FIG. 4, the extracting unit 130 extracts the object area and the road surface area based on the acquired area data and extracts the outline of the object area from the extracted object area.

As illustrated in FIG. 3D and Step S4 in FIG. 4, the extracting unit 130 extracts the bottom end of the outline of the object area from the extracted outline of the object area. Specifically, the extracting unit 130 extracts the bottom end in the Y-axis direction of the extracted outline of the object area. The extracting unit 130 supplies the bottom end data indicating the extracted bottom end of the outline of the object area to the calculating unit 140. In addition, the extracting unit 130 supplies the outline data indicating the extracted outline of the object area to the area dividing unit 150.

As illustrated in FIG. 3E and Step S5 in FIG. 4, the calculating unit 140 calculates the amount of change ΔY in the Y-axis direction of the bottom end of the outline of the object area, indicated by the acquired bottom end data. The calculating unit 140 supplies the amount-of-change data indicating the calculated amount of change ΔY to the area dividing unit 150.

As illustrated in Step S6 in FIG. 4, the area dividing unit 150 determines whether the size of the object area, in the outline of one or more object areas included in the acquired outline data, is greater than a predetermined value.

As illustrated in Step S7 in FIG. 4, the area dividing unit 150 sets a first threshold value if the size of the object area is greater than the predetermined value (YES in Step S6). As illustrated in Step S8 in FIG. 4, the area dividing unit 150 sets a second threshold value if the size of the object area is smaller than or equal to the predetermined value (NO in Step S6).

As illustrated in Step S9 in FIG. 4, the area dividing unit 150 determines whether the amount of change ΔY indicated by the acquired amount-of-change data is greater than or equal to the first threshold value set in Step S7 or the second threshold value set in Step S8.

As illustrated in FIG. 3F and Step S10 in FIG. 4, the area dividing unit 150 divides the outline of the object area in the Y-axis direction at the bottom end portion of the outline of the object area corresponding to the amount-of-change data if the amount of change is greater than or equal to the first threshold value or the second threshold value (YES in Step S9). When the multiple amounts of change greater than or equal to the first threshold value or the second threshold value are detected, the area dividing unit 150 divides the outline of the object area into multiple portions. Then, the area dividing unit 150 supplies the division data indicating the partial object area resulting from the division to the road surface contact determining unit 160.

The process goes back to Step S1 if the amount of change is not greater than or equal to the first threshold value or the second threshold value (NO in Step S9).

As illustrated in Step S11 in FIG. 4, the road surface contact determining unit 160 determines whether the partial object area indicated by the acquired division data is in contact with the road surface area. In the present embodiment, the road surface contact determining unit 160 determines whether the partial object area is in contact with the road surface area based on whether the road surface area exists in the contact determination area for the partial object area.

As illustrated in FIG. 3G and Step S12 in FIG. 4, the distance estimating unit 170 determines whether the pair of the kind of the road surface and the kind of the object is a predetermined pair if the road surface contact determining unit 160 determines that one or more partial object areas are in contact with the road surface area (YES in Step S11). The process goes back to Step S1 if the pair of the kind of the road surface and the kind of the object is not the predetermined pair (NO in Step S12). The process may go to Step S13 without performing Step S12.

As illustrated in Step S13 in FIG. 4, the distance estimating unit 170 estimates the distance from the monocular camera 10 to the object corresponding to the partial object area if the pair of the kind of the road surface and the kind of the object is the predetermined pair (YES in Step S12). The distance estimating unit 170 transmits the estimated distance to an external apparatus via the output unit 180. Then, the process goes back to Step S1 and the same operations are repeated.

The distance estimating unit 170 does not estimate the distance from the monocular camera 10 to the object if the road surface contact determining unit 160 determines that all the partial object areas are not in contact with the road surface area (NO in Step S11). Then, the process goes back to Step S1 and the same operations are repeated.

[Effects and Advantages]

Effects and advantages of the information processing apparatus 100 and the program in the embodiments will now be described.

As described above, the information processing apparatus 100 according to the above embodiment includes the image acquiring unit 110 that acquires an image captured by one monocular camera 10, the area determining unit 120 that determines an object area in the image, the area dividing unit 150 that divides the object area based on variation in the Y-axis direction at an end portion in the Y-axis direction of the determined object area, and the distance estimating unit 170 that estimates a distance from the monocular camera 10 to an object corresponding to at least one partial object area resulting from the division of the object area.

Since the object area is divided based on the variation in the Y-axis direction at an end portion of the object area in the image, as described above, the individual objects are capable of being discriminated even when the object area includes multiple objects. Accordingly, the distances from the monocular camera 10 to the individual objects are capable of being estimated.

Consequently, with the information processing apparatus 100, it is possible to accurately estimate the distance from the monocular camera 10 to a desired object even when the image includes multiple objects.

The program according to the above embodiment includes acquiring an image captured by one monocular camera 10, determining an object area in the image, dividing the object area based on variation in the Y-axis direction at an end portion in the Y-axis direction of the determined object area, and estimating a distance from the monocular camera 10 to an object corresponding to at least one partial object area resulting from the division of the object area.

Executing the above program in the above manner enables the information processing apparatus 100 to achieve the above effects and advantages.

In the information processing apparatus 100 according to the above embodiment, the area determining unit 120 further determines the road surface area in the image. The information processing apparatus 100 further includes the road surface contact determining unit 160 that determines whether the partial object area is in contact with the road surface area. If the road surface contact determining unit 160 determines that the partial object area is in contact with the road surface area, the distance estimating unit 170 estimates the distance.

Since the distance estimating unit 170 estimates the distance from the monocular camera 10 to the object corresponding to the partial object area that is in contact with the road surface area if the road surface contact determining unit 160 determines that the partial object area is in contact with the road surface area, as described above, the distance from the monocular camera 10 to an object other than the object corresponding to the partial object area that is in contact with the road surface area is not estimated. Accordingly, it is possible to suppress false detection of the distance.

In the information processing apparatus 100 according to the above embodiment, the road surface contact determining unit 160 further determines whether the road surface area that is in contact with the partial object area is the road surface area of a predetermined kind. If the road surface contact determining unit 160 determines that the road surface area that is in contact with the partial object area is the road surface area of a predetermined kind, the distance estimating unit 170 estimates the distance.

For example, an automobile running on a roadway may affect the course of the vehicle 3 running on the roadway. In contrast, it is difficult for, for example, a roadside tree planted on a sidewalk to affect the course of the vehicle 3 running on the roadway. With the above configuration, the distance estimating unit 170 estimates the distance if the kind of the road is the roadway and does not estimate the distance if the kind of the road is the sidewalk. Accordingly, the speed of the process performed by the distance estimating unit 170 is increased and the estimated distance is capable of being supplied to a process requiring real-time processing, such as a vehicle control process, with time lag being suppressed.

In the information processing apparatus 100 according to the above embodiment, the road surface contact determining unit 160 further determines whether the object corresponding to the partial object area that is in contact with the road surface area is the object of a predetermined kind. If the road surface contact determining unit 160 determines that the object corresponding to the partial object area that is in contact with the road surface area is the object of a predetermined kind, the distance estimating unit 170 estimates the distance.

For example, a mobile object, such as a person or an automobile, may affect the course of the vehicle 3. In contrast, it is difficult for, for example, a fixed object, such as a building or a tree, to affect the course of the vehicle 3 running on the roadway. With the above configuration, the distance estimating unit 170 estimates the distance if the kind of the object is the mobile object and does not estimate the distance if the kind of the object is not the mobile object. Accordingly, the speed of the process performed by the distance estimating unit 170 is increased and the estimated distance is capable of being supplied to a process requiring real-time processing, such as the vehicle control process, with time lag being suppressed.

In the information processing apparatus 100 according to the above embodiment, the road surface contact determining unit 160 further determines the kind of the road surface corresponding to the road surface area that is in contact with the partial object area and the kind of the object corresponding to the partial object area that is in contact with the road surface area. The distance estimating unit 170 estimates the distance if the pair of the kind of the road surface and the kind of the object is a predetermined pair.

As described above, the road surface contact determining unit 160 determines the kind of the road surface and the kind of the object and the distance estimating unit 170 estimates the distance if the pair of the kind of the road surface and the kind of the object is a predetermined pair. In contrast, the distance estimating unit 170 does not estimate the distance if the pair of the kind of the road surface and the kind of the object is not the predetermined pair. Accordingly, the speed of the process performed by the distance estimating unit 170 is increased and the estimated distance is capable of being supplied to a process requiring real-time processing, such as the vehicle control process, with time lag being suppressed.

The information processing apparatus 100 according to the above embodiment further includes the calculating unit 140 that calculates the amount of change in the Y-axis direction at an end portion. The area dividing unit 150 divides the object area based on the end portion the amount of change of which, calculated by the calculating unit 140, is greater than or equal to a predetermined threshold value.

As described above, the calculating unit 140 calculates the amount of change in the Y-axis direction and the area dividing unit 150 divides the object area by cutting of the object area based on the end portion the amount of change of which is greater than or equal to a predetermined threshold value. Accordingly, the portion of a rapid change is capable of being identified and the object area is capable of being appropriately divided. Consequently, it is possible to accurately estimate the distance from the monocular camera 10 to each object.

In the information processing apparatus 100 according to the above embodiment, the predetermined threshold value is set in accordance with the size of the object area.

For example, since the size of the object area is increased as the object is closer to the vehicle 3, the amount of change of the bottom end of the object area is increased. When the predetermined threshold value is constant, the object area of a single object may be divided. In contrast, since the size of the object area is decreased as the object is more apart from the vehicle 3, the amount of change of the bottom end of the object area is decreased. When the predetermined threshold value is constant, the object area of multiple objects may not be divided. With the above configuration, it is possible to suppress the division of the object area of a single object and the non-division of the object area of multiple objects.

In the information processing apparatus 100 according to the above embodiment, the area dividing unit 150 divides the object area in the Y-axis direction.

With the above configuration, the object area is capable of being divided along the direction in which the bottom end of the object area is varied. Accordingly, it is possible to divide the object area into shapes close to the shape of the object.

Other Embodiments

Although the information processing apparatus and the program according to the embodiments of the present disclosure are described above, the embodiments of the present disclosure are not limited to the above embodiments. For example, although the example is described in the above embodiments in which the vehicle 3 in which the information processing apparatus 100 is mounted is the four-wheeled vehicle, the information processing apparatus 100 may be mounted in a mobile object of another kind.

Although the example is described in the above embodiments in which the end portion in a certain direction of the object area is the collection of the bottom end points in a road surface direction (the Y-axis direction) of the object area and the object area is divided based on the variation in the road surface direction (the Y-axis direction) of the collection of the bottom end points, the division of the object area is not limited to this example. Specifically, the end portion in a certain direction of the object area may be the boundary in the road surface direction of the object area or the partial area in the road surface direction of the object area. For example, the object area may be divided based on the variation of the component in the road surface direction of the boundary between the object area and the road surface or the object area may be divided based on the variation in shape in the road surface direction of the partial area that is in contact with the road surface in the object area.

Each processor included in the information processing apparatus according to the above embodiment and the vehicle is typically realized by a large scale integration (LSI), which is an integrated circuit. The processors may be individually made into chips or may be made into chips so as to include part of all of the processors.

The circuit integration is not limited to the LSI and may be realized by a dedicated circuit or a general-purpose processor. Alternatively, a field programmable gate array (FPGA) capable of being programmed after the LSI is manufactured may be used or a reconfigurable processor in which connection and setup of circuit cells in the LSI is reconfigurable may be used.

In the above embodiments, each component may be composed of dedicated hardware or may be realized by executing a software program appropriate for each component. Each component may be realized by a program executor, such as a central processing unit (CPU) or a processor, which reads out the software program recorded in the hard disk or a recording medium, such as a semiconductor memory, for execution.

One aspect of the present disclosure may be realized as an information processing method performed by the information processing apparatus and the program.

The numbers used in the above description are only examples for specifically describing the present disclosure and the embodiments of the present disclosure are not limited to the exemplified numbers.

The division of the functional blocks in the block diagram is only an example. Multiple functional blocks may be realized as one functional block, one functional block may be divided into multiple blocks, or part of the functions may be moved to another functional block. In addition, the functions of multiple functional blocks having similar functions may be processed by single piece of hardware or software in parallel or in time division.

The order in which the steps in the flowchart are performed is only an example for specifically describing the present disclosure and the steps in the flowchart may be performed in another order. Part of the above steps may be performed concurrently with (in parallel with) another step.

Although the information processing apparatus and the program according to one or more aspects are described based on the embodiments, the embodiments of the present disclosure are not limited to the multiple aspects. Modes in which various modifications supposed by the persons skilled in the art are combined with the embodiments and modes in which the components in different embodiments are combined with each other may be included within the range of one or more aspects without departing from the spirit and scope of the present disclosure.

What is claimed is:

1. An apparatus comprising:
a processor; and
a memory storing thereon a computer program, which when executed by the processor, causes the processor to perform operations including:
acquiring an image captured by one monocular camera,
determining an object area in the image,
extracting an outline of the object area and an end portion of the outline in a predetermined direction,
dividing the object area based on a variation of the end portion of the outline in the predetermined direction of the determined object area, and
estimating a distance from the monocular camera to an object corresponding to at least one partial object area resulting from the division of the object area.

2. The apparatus according to claim 1,
wherein the determining of the object area determines a road surface area in the image,
wherein the processor operations further include
determining whether the partial object area is in contact with the road surface area, and
wherein the estimating estimates the distance if it is determined that the partial object area is in contact with the road surface area.

3. The apparatus according to claim 2,
wherein the determining of the contact with the road surface area determines whether the road surface area that is in contact with the partial object area is the road surface area of a predetermined kind, and
wherein the estimating estimates the distance if it is determined that the road surface area that is in contact with the partial object area is the road surface area of the predetermined kind.

4. The apparatus according to claim 2,
wherein the determining of the contact with the road surface area determines whether the object corresponding to the partial object area that is in contact with the road surface area is an object of a predetermined kind, and
wherein the estimating estimates the distance if it is determined that the object corresponding to the partial object area that is in contact with the road surface area is the object of the predetermined kind.

5. The apparatus according to claim 2,
wherein the determining of the contact with the road surface area determines a kind of a road surface corresponding to the road surface area that is in contact with the partial object area and a kind of an object corresponding to the partial object area that is contact with the road surface area, and
wherein the estimating estimates the distance if a pair of the kind of the road surface and the kind of the object is a predetermined pair.

6. The apparatus according to claim 1,
wherein the processor operations further include
calculating an amount of change in the predetermined direction of the end portion, and
wherein the dividing divides the object area based on the end portion the calculated amount of change of which is greater than or equal to a predetermined threshold value.

7. The apparatus according to claim 6,
wherein the predetermined threshold value is set in accordance with a size of the object area.

8. The apparatus according to claim 1,
wherein the dividing divides the object area in the predetermined direction.

9. The apparatus according to claim 1,
wherein the predetermined direction is a road surface direction toward the road surface in the image, and
wherein the end portion is a collection of end points in the road surface direction of the object area, a boundary in the road surface direction of the object area, or a partial area in the road surface direction of the object area.

10. A non-transitory recording medium storing thereon a computer program, which when executed by a processor, causes the processor to perform operations comprising:
acquiring an image captured by one monocular camera;
determining an object area in the image;

extracting an outline of the object area and an end portion of the outline in a predetermined direction, dividing the object area based on a variation of the end portion of the outline in the predetermined direction of the determined object area; and estimating a distance from the monocular camera to an object corresponding to at least one partial object area resulting from the division of the object area.

\* \* \* \* \*